No. 850,664. PATENTED APR. 16, 1907.
C. MACMILLAN.
DYNAMO ELECTRIC MACHINE.
APPLICATION FILED MAY 25, 1906.
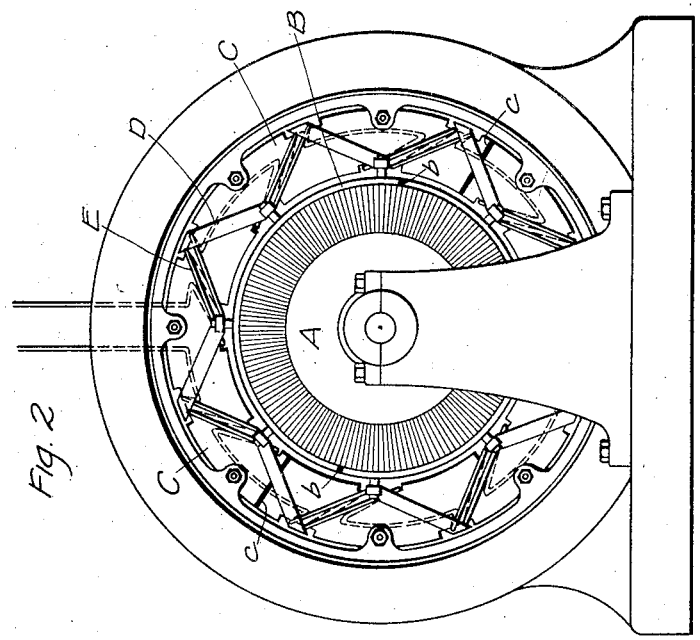
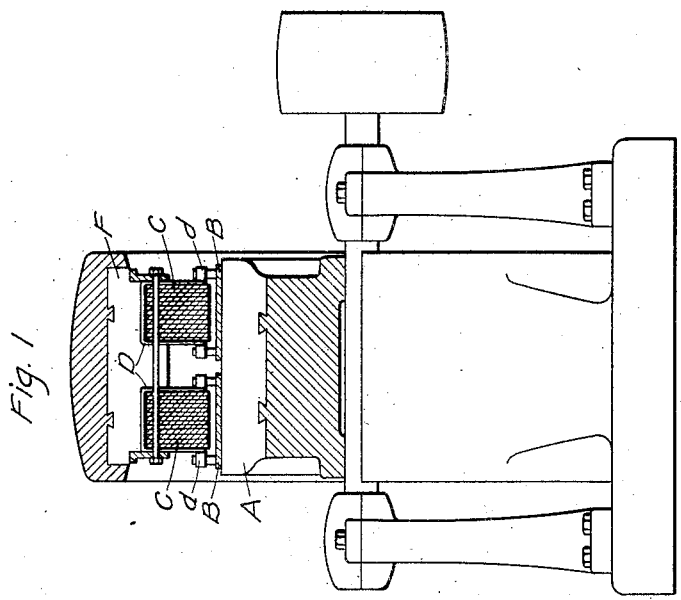
Witnesses:
Murray D Badgley
Helen Oxford
Inventor:
Campbell Macmillan
By Albert G. Davis
Att'y.

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

DYNAMO-ELECTRIC MACHINE.

No. 850,664.  Specification of Letters Patent.  Patented April 16, 1907.

Application filed May 25, 1906. Serial No. 318,728.

*To all whom it may concern:*

Be it known that I, CAMPBELL MACMILLAN, a subject of the King of Great Britain, residing at Schenectady, county of Schenectady, State of New York, have invented certain new and useful Improvements in Dynamo-Electric Machines, of which the following is a specification.

My invention relates to alternating-current dynamo-electric machines; and its object is to produce a novel type of machine, which when operated as a motor possesses series characteristics, but which does not involve the use of a commutator and which is adapted for operation on high voltages. To secure these results, I employ a construction of the unipolar type, comprising a revolving armature, preferably carrying conductors, and a stationary ring-shaped core adjacent to the conductors provided with coils, the terminals of which are connected to brushes bearing on the ends of the armature-conductors so as to form therewith a closed secondary winding around the core. I then provide a primary winding arranged to produce a circumferential flux around the core threading the secondary winding, so as to induce current therein, and arrange either the primary or secondary winding, or both, so as to produce a second flux perpendicular to the armature-conductors and their direction of motion. With this construction the ring-shaped core acts as a transformer-core. The primary winding may be adapted for connection to a high-voltage source, while the secondary winding carries large currents at low voltage, which pass through the armature-conductors. The flux perpendicular to these conductors and to their direction of motion coacting with the induced secondary currents in the armature-conductors produces rotation when the machine is operated as a motor. It will be seen that this machine as a motor possesses series characteristics and may be controlled as to speed and torque simply by varying the voltage applied to the primary winding.

My invention will best be understood by reference to the accompanying drawings, in which—

Figure 1 shows a side elevation, partly in cross-section, of a machine arranged in accordance with my invention; and Fig. 2 shows an end elevation of the same.

In the drawings, A represents the armature, which is laminated in axial planes and carries the armature-conductors B. These conductors may consist of flat plates or strips extending around the armature, but interrupted at two or more points by pieces of insulation, as indicated at $b$ in Fig. 2, arranged so as not to be bridged simultaneously by the brushes, so as to prevent the flow of short-circuit currents due to the transformer action of the motor flux of the machine. C C represent two stationary ring-shaped cores also interrupted at one or more points, as indicated at $c$, which surrounds the armature-conductors B and which carry the coils D, the terminals of which are provided with brushes $d$, bearing upon the armature-conductors B. These coils D may consist simply of three-quarters of a turn, as shown in Fig. 1, the fourth side of the coil being formed by the armature-conductor. These coils, together with the armature-conductors, form a plurality of closed circuits surrounding the core C and act as a secondary winding. The core C also carries the primary winding E, which by being properly insulated may be adapted for connection to a source of high voltage and which is arranged to produce a circumferential flux in the core C, threading the secondary winding, so as to induce currents therein. The primary and secondary coils E and D are arranged on the core at an angle to each other, as clearly shown in Fig. 2, so that the currents in the two coils assist each other in producing a radial flux which passes from one core C radially inward, cutting an armature-conductor B, then axially through the armature A, outward through the other core C, and back in an axial direction through the field-magnet F, which is axially laminated and supports the two cores C. It will be seen that this radial flux cutting the armature-conductors, in conjunction with the current in the armature-conductors induced by transformer action in the secondary winding, will produce a torque, and that this torque will be proportional to the radial flux and to the armature-current. Consequently the torque of the machine will be proportional to the square of the impressed voltage, so that the machine will have the characteristics of the usual series motor and may be controlled simply by varying the voltage impressed on the primary winding.

While I have shown both primary and secondary windings arranged to assist in producing the motor flux of the machine, it is obvious that the coöperation of the two windings is not essential for this purpose. It is sufficient if either winding is arranged so as to include conductors extending in the circumferential direction with respect to the armature, and it is not necessary that the same conductors should be active in producing both transformer and motor flux; but, on the contrary, these two actions may be separated, as will be obvious to those skilled in the art. It is only essential that the windings should be so arranged as to produce, first, a transformer-flux threading the closed secondary winding, and, second, a motor flux perpendicular to the armature-conductors and their direction of motion. Furthermore, although I have shown an armature of the drum type other types may be employed, if preferred. Consequently I do not desire to limit myself to the particular construction and arrangement of parts here shown, but aim in the appended claims to cover all modifications which are within the scope of my invention.

What I claim as new, and desire to secure by Letters Patent of the United States, is—

1. An alternating-current unipolar machine, comprising a revolving armature, a stationary ring-shaped core adjacent to said armature, coils carried by said core provided with brushes engaging said armature so as to form therewith a closed winding around said core, and means for producing a circumferential flux in said core for inducing current in said closed winding and a flux perpendicular to the surface of the armature between said brushes.

2. An alternating-current unipolar machine, comprising a revolving armature, stationary coils provided with brushes engaging said armature so as to form therewith a closed secondary winding, and a primary winding arranged to induce current in said secondary winding, at least one of said windings including conductors extending circumferentially with respect to said armature so as to produce a flux perpendicular to the surface of said armature between said brushes.

3. An alternating-current unipolar machine, comprising a revolving armature, a stationary ring-shaped core adjacent to said armature, coils carried by said core provided with brushes engaging said armature so as to form therewith a closed secondary winding around said core, and a primary winding arranged to produce a circumferential flux in said core threading said secondary winding, one at least of said windings including conductors extending circumferentially with respect to said armature so as to produce a flux perpendicular to the surface of said armature between said brushes.

4. An alternating-current unipolar machine, comprising a revolving armature, conductors carried thereby, a stationary ring-shaped core adjacent to said conductors, coils carried by said core provided with brushes engaging said conductors so as to form therewith a closed winding around said core, and means for producing a circumferential flux in said core for inducing current in said closed winding and a flux perpendicular to said conductors and their direction of motion.

5. An alternating-current unipolar machine, comprising a revolving armature, conductors carried thereby, a stationary ring-shaped core adjacent to said conductors, coils carried by said core provided with brushes engaging said conductors so as to form therewith a closed secondary winding around said core, and a primary winding arranged to produce a circumferential flux in said core threading said secondary winding, said windings being arranged to produce a flux perpendicular to said conductors and their direction of motion.

6. An alternating-current unipolar machine, comprising a revolving armature, conductors carried thereby, stationary coils provided with brushes engaging said conductors so as to form therewith a plurality of closed circuits, and means for producing a transformer flux threading said circuits so as to induce current therein and a motor flux perpendicular to said conductors and their direction of motion.

7. An alternating-current unipolar machine, comprising a revolving armature, conductors carried thereby, a stationary ring-shaped core adjacent to said conductors, coils carried by said core provided with brushes engaging said conductors so as to form therewith a closed secondary winding around said core, and a primary winding around said core, said primary and secondary winding being arranged at an angle to each other on said core so as to produce a component flux perpendicular to said conductors and their direction of motion.

8. An alternating-current unipolar machine, comprising a revolving armature, conductors carried thereby, stationary coils provided with brushes engaging said conductors so as to form therewith a closed secondary winding, and a primary winding arranged to induce current in said secondary winding, at least one of said windings including conductors extending circumferentially with respect to said armature so as to produce a flux perpendicular to said conductors and to their direction of motion.

9. An alternating-current unipolar machine, comprising a revolving drum-armature laminated in axial planes, conductors carried thereby, a stationary field-magnet laminated in axial planes, a ring-shaped core laminated in planes perpendicular to the axis carried by said field-magnet and surrounding the armature-conductors, coils carried by said core provided with brushes engaging said conductors so as to form therewith a closed secondary winding around said core, and means for producing a circumferential flux in said core for inducing a current in said secondary winding and a radial flux cutting said conductors.

10. An alternating-current unipolar machine, comprising a revolving drum-armature laminated in axial planes, conductors carried thereby, a stationary field-magnet laminated in axial planes, a ring-shaped core laminated in planes perpendicular to the axis carried by said field-magnet and surrounding the armature-conductors, coils carried by said core provided with brushes engaging said conductors so as to form therewith a closed secondary winding around said core, and a primary winding arranged to produce a circumferential flux in said core threading the secondary winding, at least one of said windings including conductors extending circumferentially so as to produce a radial flux cutting the armature-conductors.

In witness whereof I have hereunto set my hand this 24th day of May, 1906.

CAMPBELL MACMILLAN.

Witnesses:
BENJAMIN B. HULL,
HELEN ORFORD.